INVENTOR.
WILLIAM J. WALDEN,
BY
Allen + Allen
ATTORNEYS.

May 29, 1962 W. J. WALDEN 3,036,707
METHOD AND APPARATUS FOR CLEANING SEEDS AND
SEPARATING CERTAIN SEEDS FROM OTHERS
Filed Oct. 1, 1959 2 Sheets-Sheet 2
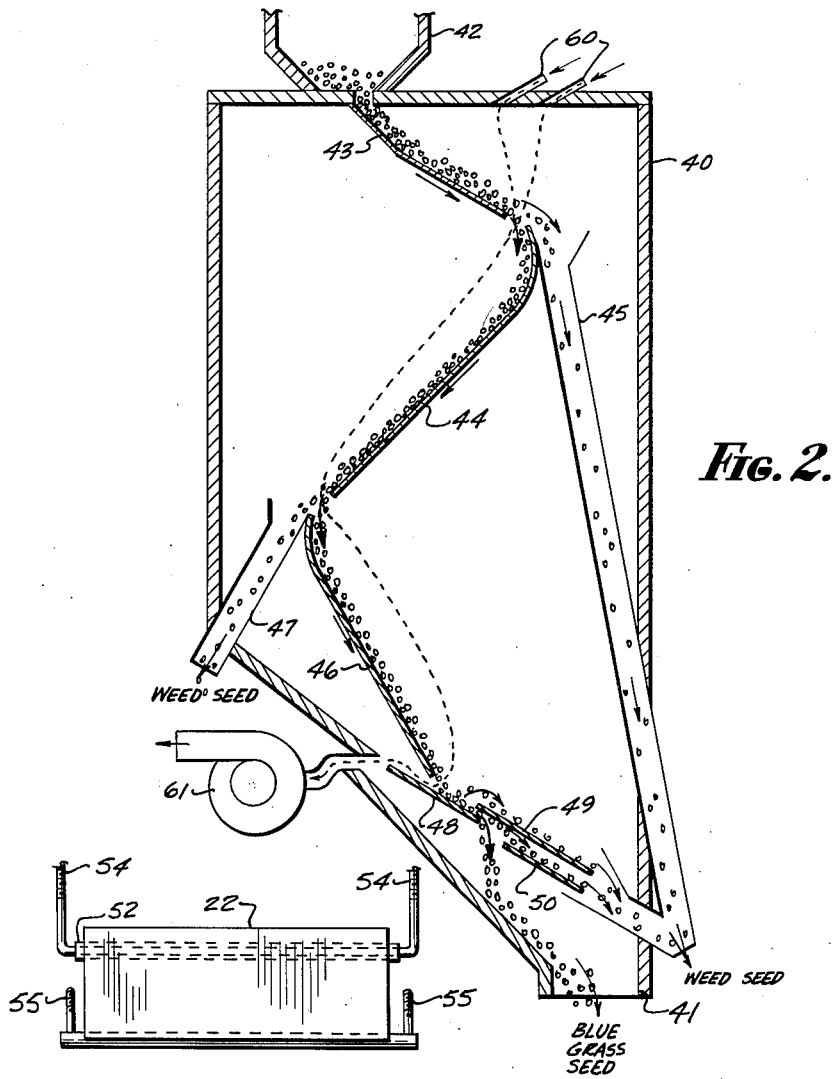
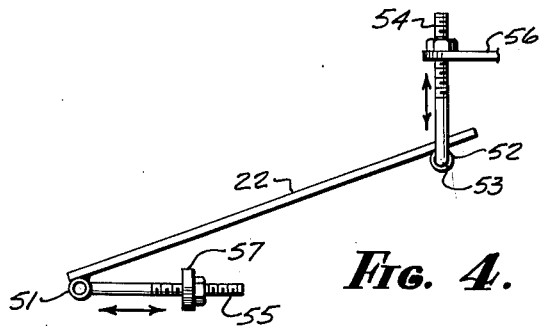
INVENTOR.
WILLIAM J. WALDEN,
BY
Allen + Allen
ATTORNEYS.

United States Patent Office 3,036,707
Patented May 29, 1962

3,036,707
METHOD AND APPARATUS FOR CLEANING SEEDS AND SEPARATING CERTAIN SEEDS FROM OTHERS
William J. Walden, Midway, Ky., assignor to W. J. Walden Seed Company, Inc., Midway, Ky., a corporation of Kentucky
Filed Oct. 1, 1959, Ser. No. 843,674
12 Claims. (Cl. 209—115)

My invention resides in an improved method and apparatus for cleaning seeds and separating certain seeds from others. This invention has particular application to the cleaning and separating of bluegrass seeds so as to obtain bluegrass seeds of highest quality and purity with a minimum of time and cost.

In the cultivation and harvesting of bluegrass seed for the market, there is always a fairly large amount of debris, weed seeds and cereal grains which are picked up along with the bluegrass seed. Heretofore it has been the practice to sack the harvested seed, including all of the accompanying extraneous matter, and run it through an elaborate series of thrashing and separating devices whereby eventually to gather the good bluegrass seed in one place and the undesirable weed seeds, cereal grains and other matter at another place or places throughout the system. One of the chief difficulties with presently known apparatus and systems is that the purity of the bluegrass seed obtained by only one passing of the initial material through the system is ordinarily not of an acceptable quality for the market which means that this seed must be run through the system an additional one or more times, all of which results in more seed being wasted, more time being consumed and more money being lost. In addition these known thrashing and separating devices employ moving parts which often become fouled and which require constant attention.

I have discovered that various seeds have different characteristics, not only in size and density but also in their ability to flow and bounce. In particular, for example, I have found that a good bluegrass seed, even though it be substantially of the same size and weight as an undesirable weed seed, nevertheless will differ from such undesirable seed in other characteristics. Thus I have found that a bluegrass seed will not flow down a metal plate so fast as will a weed seed of corresponding size and weight. In addition I have found that when the bluegrass seed and weed seed now being considered by way of example are permitted to bounce on a plate, the weed seed will bounce higher. In addition I have found that as seeds are moved through the thrashing and separating apparatus they accumulate a static electricity which tends to make them stick together. The accumulation of this static electricity is apparently affected by humidity. I have found that the accumulation of such electricity in bluegrass seeds makes them more susceptible to magnetic forces than are weed seeds with the result that if bluegrass seeds and weed seeds strike a magnetized plate, the difference in their bounce from such plate will be even more exaggerated, the bluegrass seed bouncing relatively very little and the weed seed bouncing relatively very much.

I have mentioned my discovery that bluegrass seeds flowing down a smooth surface such as a metal, glass or plastic plate, will flow, roll or scoot down such plate at a slower speed than will the weed seed with the result that the bluegrass seed will have a shorter trajectory upon leaving the end of such plate. I have found further that this difference in trajectory between bluegrass seed and weed seed can be exaggerated by a downward flow of air which shortens the trajectory of the bluegrass seed more than that of the faster moving weed seed.

The discoveries above reviewed, and others which will be made known throughout the following description of the invention, have been employed by me in arriving at an improved process and apparatus for cleaning and separating certain seeds from others. Certain of my discoveries are easily incorporated along with the presently known systems and apparatus used for cleaning and separating seeds. Also, my invention lends itself well to incorporation as a final, and additional, stage in the method and apparatus.

It is a very important object of my invention to provide a method and apparatus for cleaning and separating certain desired seeds from undesirable seeds, which method and apparatus will accomplish the desired separation in one pass of the material being treated.

Another object of my invention is to accomplish separation of certain seeds from others with apparatus utilizing no moving parts, although certain of the parts may be movable to positions which will give the best results for the material being treated.

Specifically it is an object of my invention to provide a method and apparatus which will effect separation of certain seeds from others by making use of my discovery that certain seeds will skid, roll or flow over metal, glass or plastic to varying degrees, that certain seeds will bounce off hard surfaces to varying degrees, that certain seeds are more affected by magnetic plates and that certain seeds are more affected by downward drafts of air.

These and other objects of my invention will become apparent to those skilled in the art during the course of the following descriptions and with reference to the accompanying drawings, in which drawings like numerals are employed to designate like parts and in which:

FIGURE 2 is a diagrammatic illustration of a separating apparatus constructed according to the teachings of this invention;

FIGURE 3 is a fragmentary front elevation of a novel manner of mounting one of the various plates used in my novel apparatus; and FIGURE 4 is a side elevation of the plate structure shown in FIGURE 3.

Figure 1:
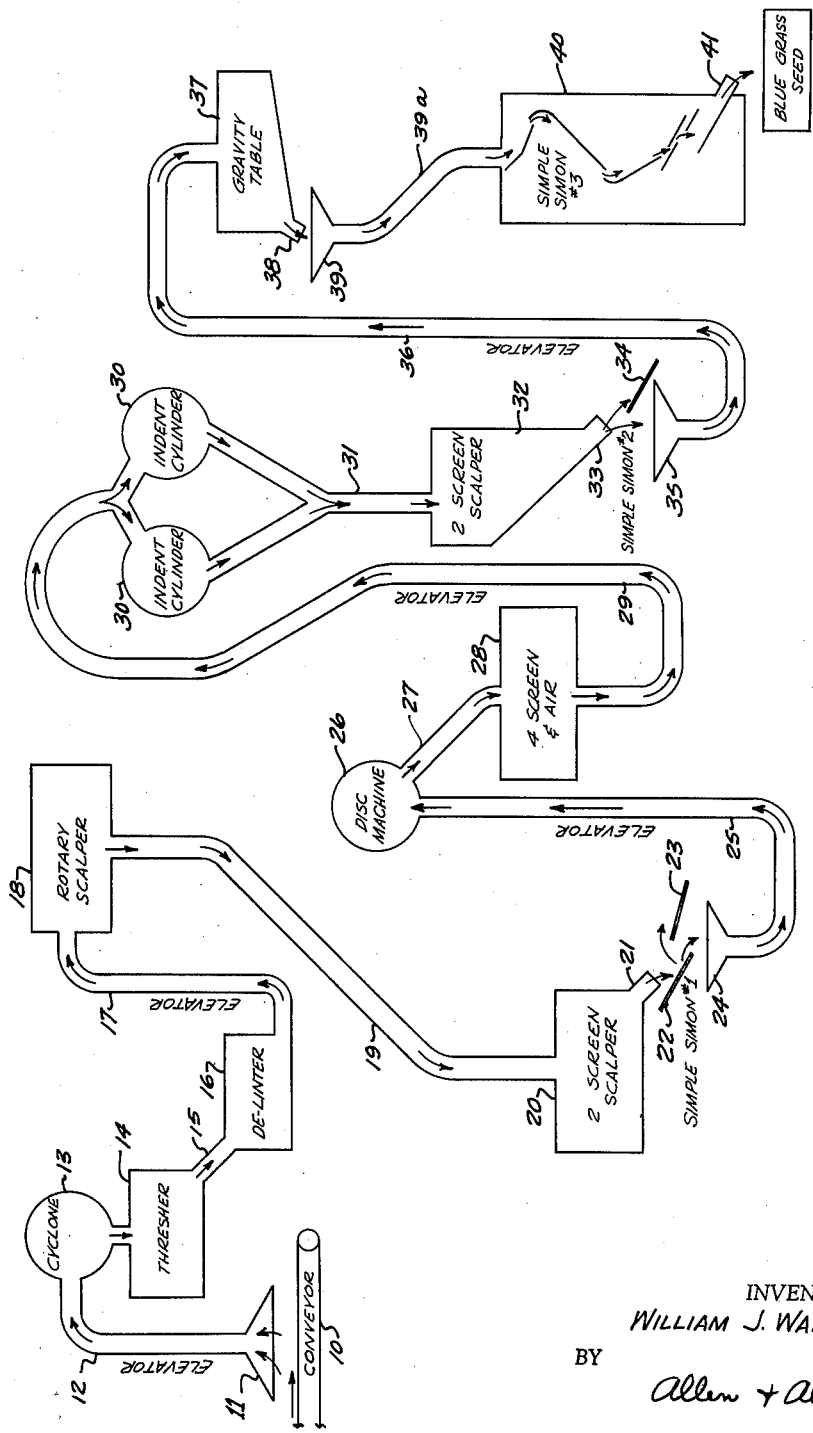
FIGURE 1 is a diagramatic illustration of both a method and apparatus for cleaning and separating certain seeds from others, this figure illustrating not only that which is old and well-known but also that which has been added by the instant teachings.

Although I shall describe my invention with particular application to the cleaning and separating of bluegrass seed from undesirable materials of all kinds, it will be understood that the principles discovered and invented by me can, with variations, be applied by those skilled in the art to the cleaning and separating of other seeds and materials. I do not intend to be limited to the cleaning and separating of bluegrass seed except insofar as I so designate in the claims which will follow.

Referring now to FIGURE 1 I shall describe the "one pass" cleaning and separating of bluegrass seed made possible by the method and apparatus of this invention and which, of course, has been made possible by my discoveries as above outlined.

When the bluegrass seed is ready for harvesting it is so harvested by seed stripping machines which are well-known in the art. These machines strip the seed ends of the grass and make it possible for such stripped material to be collected in bags and sacks. This sacked material as it comes from the field will include cheat, dried grass, sticks, stones, dirt, cereal grains and weed seeds, as well as the bluegrass seed. Sacks of this material are slit open and dumped on an endless conveyor 10 which is old and well-known. Conventional means will be employed to operate this conveyor when desired. The material on the conveyor passes beneath a hood 11 depending from an elevator 12. This elevator, which is also old and well-known, comprises a conduit through which air is drawn in the direction indicated by the arrows. This draft of air will cause the lighter materials to be sucked up within the elevator 12 leaving the heavier sticks, stones and clumps of dirt to be carried away by the conveyor 10.

The material sucked up from the conveyor 10 through the hood 11 and elevator 12 passes through an old and well-known cyclone device 13 and thence to an old and well-known thresher 14. In the thresher 14 the seeds, which includes the weed seeds and cereal grains as well as the bluegrass seed, are separated from their mother grass body and the like and conveyed through the passage 15 to the de-linter 16. It will be understood that the grass blades, cheat and other waste material (material other than the seeds of all kinds) will be discharged from the apparatus in conventional manner, although this is not shown in detail in these drawings.

Nature provides bluegrass seed with a cotton-like coating to protect it from early germination in the field under those conditions when the seed is permitted to ripen and fall to the ground. This ordinarily takes place in June and were it not for this protective coating the seeds would germinate on the ground during the hot summer months whereafter the resulting shoots of grass would be killed by the heat. In commercial operation, however, the bluegrass seed is harvested before it falls to the ground and thus will have this cotton-like coating thereon. This coating is what is removed by the de-linter 16, which de-linter is also an old and well-known piece of apparatus. Again the waste material, in this case the cotton-like coating, is discharged from the system while all of the seeds continue through the elevator 17 to a rotary scalper 18.

Bluegrass seeds are known to have an average size, shape and density. These will differ from the characteristics of other seeds and cereal grains. Separation of the bluegrass seed from these other seeds and grains can to a large part be accomplished by devices which are sensitive to differences in the size, shape and weight of these seeds. One such device is the rotary scalper which, again, is an old and well-known device. Certain of the materials which are no longer than blue-grass seed and certain of the materials which are shorter than bluegrass seed are here separated from the bluegrass seed and discharged. The seed, still containing a fair amount of undesirable weed seeds and grain, continues through the elevator 19 to another separating device which is designated the two screen scalper shown at 20. This is also a well-known and conventional piece of apparatus by means of which further separation of bluegrass seed from the other matter is accomplished, such other matter again being discharged from the apparatus. The bluegrass seed, still containing other undesirable seeds and grains but in decreasing percentage amounts, is discharged at 21.

I have found this to be a convenient place to locate a portion of my improved apparatus for aiding in the further separation of the bluegrass seed from the undesirable matter. This I have designated in the drawing as Simple Simon No. 1. In essence this apparatus comprises two chutes or plates 22 and 23. The angle of these plates and their position with respect to one another may be varied. FIGURES 3 and 4, which will be described later, show a novel, desired construction for such plates. The plate or chute 22 is located so as to receive the seeds which are discharged from the apparatus 20 through the conduit 21. This plate 22 is made of a hard material such as metal, glass or plastic. The seeds are permitted to fall on this plate so that they may bounce off it. The plate 23 is located so that those seeds which bounce the highest bounce up onto the plate 23 and are removed from the system. As I have mentioned earlier, I have discovered that those seeds which bounce the highest are the undesirable weed seeds. The bluegrass seeds do not bounce so high as to reach the plate 23 with the result that they are collected at 24 and continued through the apparatus by the elevator means 25. The separation accomplished at Simple Simon No. 1 as constituted by the plates 22 and 23 is not complete but it does effect a further separation not heretofore accomplished. The skimming off of these high-bouncing undesirable weed seeds is an important part of this invention.

The low-bouncing seeds collected at 24, and still containing an undesirably high percentage of weed seeds, are moved by the elevator-conveyor 25 to the disc machine 26. This disc machine is also an old and well-known piece of equipment. This disc machine or disc sizer serves primarily to reject material and seed longer than the good bluegrass seeds, the undesirable material again being discharged from the unit while the seeds remaining are conveyed through the conduit 27 to the screen and air separator 28.

The unit 28 is also old and well-known and generally comprises a series of four reciprocating screens of various sizes to further sort out and separate the seeds. In this unit there is usually air blowing upwardly throughout to eliminate dust and material lighter than bluegrass seed. The undesirables are again discharged from the unit while the seeds continue through the elevator-conveyor 29. Although the percentage of good bluegrass seed is steadily increasing, further separation has to be accomplished.

Seeds from the unit 28 are conveyed by the elevator conveyor 29 to a pair of indent cylinders 30. These cylinders 30, also old and well-known, serve primarily to remove those seeds which are smaller and rounder than bluegrass seeds. These seeds are again removed from the unit and the remaining seeds continued on their way via the conduit 31.

Seeds moving from the conduit 31 pass into another two-screen scalper, again a conventional piece of apparatus which I have indicated at 32. Further seed separation is accomplished here with the waste material being removed. I have found this to be a convenient place to locate another portion of my improved apparatus. As the seeds leave the apparatus 32 they flow down a hard plate 33. Here I locate what I term my Simple Simon No. 2, which in this case is simply a plate 34 located below and to one side of the end of the plate 33. As the seeds flow down this plate 33 some will have a greater velocity than others and these will have a greater trajectory. As above noted, I have found that weed seeds and other undesirable materials will skid, roll and/or flow faster than good bluegrass seed and, accordingly, will have a longer trajectory. The plate 34 is located so as to skim off these materials shooting the farthest from the end of the plate 33, the bluegrass seed falling into the receptacle 35. Again, the separation accomplished by Simple Simon No. 2 is not complete; the seeds gathered at 35 still contain some weed seeds, cereal grains and undesirable matter, although the percentage of good bluegrass seed has been increased. This percentage is increased even more by the use of my Simple Simon No. 2, that is, the plate 34 located as shown and described with respect to the plate 33.

The seeds remaining are now conveyed by the elevator-conveyor 36 to a gravity table 37 which is also a conventional and well-known piece of equipment. This table, as is well-known, separates the seeds fairly well on the basis of their specific gravity. The heavier seeds are eliminated. By way of example it will be noted that the weight per bushel of clover seeds is 60 pounds; wheat, 58 pounds; corn 56 pounds; fescue, 30 pounds and bluegrass, 21 pounds. Weed seeds are also heavier. These heavier seeds are again discharged from the unit while the lighter seeds leave the gravity table 37 at 38 and are collected in the receptacle 39.

The method, system and apparatus so far described, with the exception of the apparatus involved at stations designated by me as Simple Simon No. 1 and Simple Simon No. 2, constitute that which has heretofore been known. The seeds heretofore collected at 39, however, although containing a fairly high percentage of good bluegrass seed, were not in acceptable commercial condition of purity and quality with the result that formerly these seeds were collected and reintroduced into the system at about the rotary scalper indicated at 18. One, and more often several, additional passes of these materials through the system were necessitated before a sufficiently high quality product was obtained at 39. Obviously this resulted in not only a waste of time but also a loss of some good bluegrass seed and, of course, it necessitated additional use of time, labor and machinery.

With the addition of my apparatus designated as Simple Simon No. 1 and Simple Simon No. 2, the material collected at 39 may be passed to a third Simple Simon which will result in an end product of bluegrass seed which will meet all commercial requirements and will not necessitate any further separation. Indeed, it appears that the seed discharged at 41 from Simple Simon No. 3 as indicated at 40, is completely free of any germinatable, undesirable weed seeds and extraneous matter. Thus by incorporating the apparatus 22—23 and 34, and conveying the material by the elevator-conveyor 39a to the Simple Simon No. 3 indicated at 40, I achieve the complete results stated in the objects of this invention. The unit No. 40 is best seen in FIGURE 2.

Referring now particularly to FIGURE 2 it will be observed that material conveyed from the gravity table 37 by the elevator-conveyor 39a is introduced to the unit 40 via a hopper 42. The hopper 42 may itself be of conventional type and may contain a screw conveyor, not shown, to distribute the seed along the full width of the first plate 43 incorporated at the top of the unit. The hopper and conveyor may be provided with additional means, not shown, which will be understood to those skilled in the art, to interrupt from time to time, as desired, the flow of seeds down the plate 43. Such interruption is sometimes desirable so as to make certain that the faster flowing, scooting or rolling seeds have time and room in which to increase their momentum, thus their trajectory, and thereby be eliminated as will be described further. The plate 43 is not a moving part during operation but it will be understood that it is movable so that its angle of discharge may be varied; the plate 43 may be moved so as to vary its steepness.

A plate 44 is located adjacent the lower end of the plate 43. Although this plate is not a moving part during operation of the apparatus, it is preferred that it be movable in two directions. It may be moved so as to vary its steepness and also it may be moved so as to vary its position with respect to the lower end of the plate 43. As the final batch of seeds slides down the plate 43, the faster moving seeds will have a greater trajectory and will, therefore, fly beyond the upper end of the plate 44 and be received in a discharge conduit 45. The slower moving seeds, which will be predominantly bluegrass seeds, will fall short of the upper end of the plate 44 and will continue sliding movement along the plate 44 as indicated.

Another plate 46 within the unit 40 is located adjacent the lower end of the plate 44. This plate 46 is arranged to effect another "scoot" separation. Like the plate 44, it is movable so as to vary its steepness and also with respect to the lower end of the plate 44. Again, the faster moving seeds coming down the plate 44 project themselves outwardly a greater distance from the end of the plate 44, flying beyond the upper end of the plate 46 and being collected in the weed seed discharge conduit 47. The slower moving bluegrass seeds fall on the plate 46 and continue their downward movement thereon.

Mounted below the lower end of the plate 46 is a bounce plate 48. The angle of this plate with respect to that of 46 may be changed as well as its relative position with respect to the lower end of the plate 46. A movably mounted skim plate 49 is located adjacent the plate 48. The seeds which fall from the plate 46 onto the bounce plate 48 will bounce off the plate 48 in accordance with the characteristics I have earlier described. The relatively few remaining weed seeds will bounce high and be skimmed off by the plate 49. The bluegrass seed will not bounce high enough to reach the upper side of the plate 49 and will slide off the lower end of the plate 48. Here I effect a final "scoot" separation by locating another plate 50 beneath the plate 49. Again the last remaining weed seeds will traject themselves further from the lower end of the plate 48 and be collected on the plate 50, which is adjustable in the same manner as the other plates, while the good, bluegrass seed will exit through the conduit terminal 41.

Although the plate 48 may be made of hard metal, glass or plastic I prefer that it be a magnetized plate. I have found that blueglass seed are more affected by magnetism with the result that their bounce is diminished to a greater extent than that of the weed seed, thus permitting a more exact skimming off of the relatively higher bouncing weed seeds by the plate 49. It will be apparent that this fact may also be utilized in connection with the plate 22, Simple Simon No. 1 (FIGURE 1), if desired.

Incorporation of the three Simple Simons I have developed in the otherwise old method, system and apparatus generally indicated in FIGURE 1, has enabled me to produce for the first time, in one pass, bluegrass seed of the very highest quality, seed which is free of all germinatable weed seed and cereal grains.

Preferably I may employ with the unit shown in FIGURE 2 a downdraft of air entering the top of the unit 40 at 60 and exiting at the bottom. This air may be pulled through the apparatus by the fan 61. The air thus pulled takes the path indicated by the dotted arrow in FIGURE 2. This downdraft of air I have found to greater differentiate the amount of "scoot" and "bounce" between bluegrass seed and weed seed; the bluegrass seed will scoot and bounce relatively less under this type air condition than will the undesirable weed seed, thus making a cleaner separation between the two possible.

The bounce plates 22 and 48 also serve to break up clusters of seeds which might otherwise stick together, thus insuring a better separation of bluegrass seed from the weed seed.

From the above it will be seen that this method and system takes into consideration the texture of various seeds or materials, their hardness or softness, their slickness or roughness of their coating and even the consistencies of the seeds themselves. The various flow plates and skim plates may be adjusted vertically and with respect to one another according to the seeds being separated and in accordance with the differences in velocity and bounce characteristics therebetween. Additional plates may be used if desired in order to increase the separation and impart more friction, and thereby more static electricity, to the seeds, whereby to make greater use of the magnetic separation where desired. The downward airstream enables greater control of the trajectory of the various seeds. This may also be affected by controlling the humidity so as to produce more or less of the accumulated static electricity within the seeds. And the intermittent flow of materials down the various separator plates will enable better control of the separating processes as described.

The intermittent flow of materials just mentioned is what I term "wave feeding." This is easily obtained by controlling delivery from the hopper 42. The object is to obtain a spacing of feed, i.e., to obtain a plurality of ribbons of seed across the plate 43, the ribbons being spaced from one another. This enables the faster flowing or rolling seeds to separate themselves from each ribbon and accelerate their speed. This in turn increases the trajectory of these faster moving particles and results in a greater skip, thus making it easier to skim them from the slower moving bluegrass seeds. If wave feeding is not employed there may not be enough room for the faster moving particles to separate themselves from the main bunch—there may be too much interference from the slower moving particles.

Referring now to FIGURES 3 and 4 I have shown a manner in which the various plates may be mounted for fine adjustment. A typical plate, for example the plate 22 of Simple Simon No. 1 in FIGURE 1, is illustrated. This plate may be welded at one end to a rod or pipe 51. At the upper end the plate 22 simply rests on a pipe 52 through which there is a rod 53. Adjustment screws 54 are fixed to or made integral with the rod 53 and other adjustment screws 55 are connected to the member 51. The adjustment screws 54 and 55 are located in suitable frame members 56 and 57 of the apparatus. By these means the plate 22 may have a very fine adjustment with a minimum of difficulty. It will be understood that all plates similar to the plate 22 may be mounted in like fashion so as to make it possible to control the plate positions in accordance with the bounce and scoot characteritsics of the seeds being separated.

It is believed that the operation of the invention has been fully described in the foregoing passages. It should be understood, however, that although I have shown a facet of the invention embodied in certain apparatus, this is exemplary only, and I do not intend to be limited to such specific and particular apparatus except insofar as it is specifically set forth in the subjoined claims. Also, although I have described the invention, from both process and apparatus viewpoints, as having specific application to the cleaning and/or separation of bluegrass seeds, the basic invention may be applied to the separation of other materials in accordance with my teachings as set forth herein. In any event I have found this invention to constitute a decided improvement in the cleaning and separation of bluegrass seeds all as set forth above.

It will be apparent to those skilled in the art that modifications may be made in this invention without departing from its scope and spirit. Having thus described my invention, what I claim as new and what I desire to protect by United States Letters Patent is:

1. A process of separating a desired type of seeds, having a particular bouncing characteristic, from weed seeds and extraneous matter having a different bouncing characteristic, which comprises the steps of sliding the seeds and matter down a surface, causing the sliding seeds and matter to fall from said surface onto a hard surface, and separating the undesired seeds and matter from the desired seeds in accordance with said distinctive bouncing characteristics, whereby said undesired seeds and extraneous matter are removed from said desired seeds.

2. The process claimed in claim 1 wherein said desired type of seeds is bluegrass seeds.

3. The proces claimed in claim 2 wherein a magnetic force is introduced into said hard surface.

4. A process of separating a desired type of seeds from weed seeds and extraneous matter, which comprises the steps of sliding said seeds and extraneous matter down and off a surface, each type of seed and extraneous matter present attaining a different velocity at the lower end of said surface, and thus having a different trajectory upon leaving said surface, and separating the undesired seeds and matter on the basis of their different trajectories, whereby said undesired seeds and matter are removed from said desired seeds.

5. The process claimed in claim 4, wherein said desired type of seeds is bluegrass seeds.

6. A process of separating a desired type of seeds, having a particular bouncing characteristic, from weed seeds and extraneous matter having a different bouncing characteristic, which comprises the steps of sliding the seeds and matter down a surface, causing the sliding seeds and matter to fall from said surface onto a hard surface, and separating off the higher bouncing seeds and matter in accordance with their distinctive bouncing characteristic, and then sliding the remaining seeds and matter down and off a second surface, each type of seed present attaining a different velocity at the lower end of said second surface, and thus having a different trajectory upon leaving said second surface, and separating off the seeds and matter which fly out the farthest from the lower end of said second surface, whereby the weed seeds and extraneous matter are removed from said desired seeds.

7. The process claimed in claim 6 wherein said desired type of seeds is bluegrass seeds.

8. The process claimed in claim 6 wherein a magnetic force is introduced into said hard surface.

9. A process of separating a desired type of seeds from weed seeds and extraneous matter, which comprises the steps of sliding said seeds and matter down and off a surface, each type of seed and matter present attaining a different velocity at the lower end of said surface and thus having a different trajectory upon leaving said surface, and separating off the undesired seeds and matter in accordance with their distinctive trajectories, then sliding the remaining seeds and matter down and off a second surface, each type of seed and matter still present attaining a different velocity and having a different trajectory upon leaving said second surface, and again separating off those undesired seeds and matter in accordance with their distinctive trajectories, and then sliding said remaining desired seeds having a distinctive bouncing characteristic, and said remaining undesired seeds and extraneous matter having a different bouncing characteristic, down a third surface, causing said seeds and matter to fall from said third surface onto a hard surface, and separating off the undesired seeds and matter in accordance with their distinctive bouncing characteristics, and at the same time separating off still more undesired seeds and matter in accordance with their distinctive trajectories from the end of said hard surface, whereby the weed seeds and extraneous matter are removed from said desired seeds.

10. The process claimed in claim 9 wherein said desired type of seeds is bluegrass seeds.

11. The process claimed in claim 10 wherein a magnetic force is introduced into said hard surface.

12. The process claimed in claim 11 carried on in the presence of a downdraft of air.

References Cited in the file of this patent

UNITED STATES PATENTS

| | | |
|---|---|---|
| 538,320 | Carter | Apr. 30, 1895 |
| 2,304,554 | Dixon | Dec. 8, 1942 |

FOREIGN PATENTS

| | | |
|---|---|---|
| 414,916 | Italy | Sept. 5, 1946 |
| 471,449 | Canada | Feb. 6, 1951 |